May 8, 1923.
C. D. LENNON
1,454,548
MACHINE FOR PULVERIZING AND CLEANING SOIL
Filed Sept. 18, 1922  2 Sheets-Sheet 1
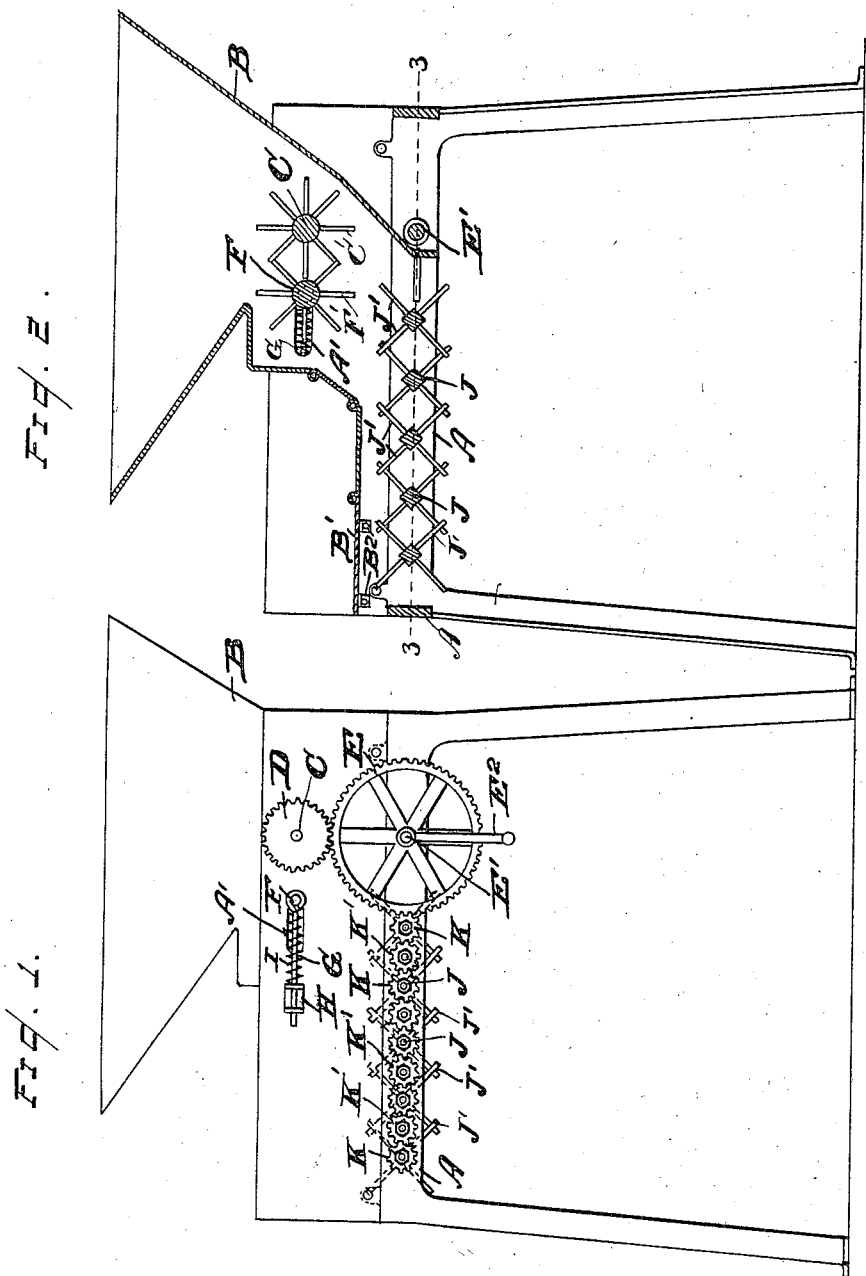

May 8, 1923.
C. D. LENNON
1,454,548
MACHINE FOR PULVERIZING AND CLEANING SOIL
Filed Sept. 18, 1922    2 Sheets-Sheet 2
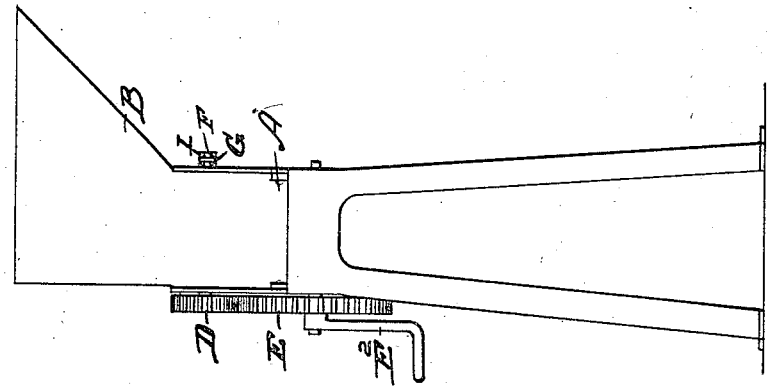
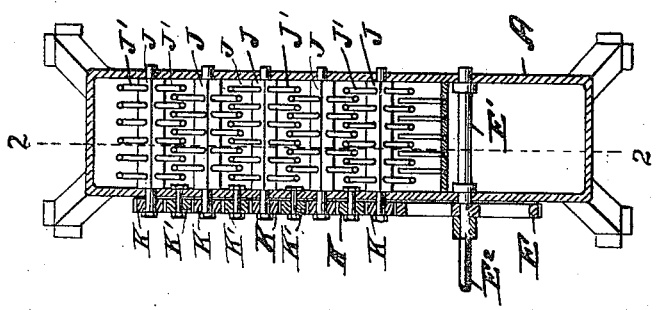
Inventor
Clarence D. Lennon
By  S. E. Thomas
Attorney

Patented May 8, 1923.

1,454,548

UNITED STATES PATENT OFFICE.

CLARENCE D. LENNON, OF DETROIT, MICHIGAN.

MACHINE FOR PULVERIZING AND CLEANING SOIL.

Application filed September 18, 1922. Serial No. 588,787.

*To all whom it may concern:*

Be it known that I, CLARENCE D. LENNON, citizen of the United States, residing at Detroit, county of Wayne, State of Michigan, have invented a certain new and useful Improvement in Machines for Pulverizing and Cleaning Soil, and declare the following to be a full, clear, and exact description of the same, such as will enable others skilled in the art to which it pertains to make and use the same, reference being had to the accompanying drawings, which form a part of this specification.

My invention relates to a machine for pulverizing and cleaning soil shown in the accompanying drawings and more particularly described in the following specification and claims.

Plants grown in greenhouses require frequent repotting in fresh soil to stimulate their growth and to meet the root requirements as they increase in size.

Before transplanting it is well understood that the soil should be carefully pulverized and all sticks, stones or other foreign matter removed before transferring the plant to its new pot.

It has therefore been customary to carefully break up the soil and then sift it to remove the sticks, stones or other refuse that may be lodged therein. To do this thoroughly involves a great deal of time and labor; therefore the primary object of this invention is to provide a machine which is adapted to quickly and thoroughly pulverize the soil and to automatically separate and remove all sticks, stones or rubbish which may be mixed therewith.

A further object of the invention is to provide a construction that will not become clogged either by sticks, stones, or the dirt which it is designed to pulverize;—and while readily separating rubbish or other foreign matter from the soil, will prevent the soil from clogging the machine regardless of its condition at the time operated upon.

With the foregoing and other objects in view which will appear as the description proceeds the invention further resides in the combination, and arrangement of parts and in the details of construction hereinafter described and claimed, it being understood that changes may be made in the precise embodiment of the invention herein disclosed without departing from the spirit of the same.

In the drawings accompanying this specification:

Figure 1 is a side elevation of the machine showing a train of gears for operating the device;—the gear cover plate having been removed.

Figure 2 is a longitudinal vertical sectional view taken on or about line 2—2 of Figure 3.

Figure 3 is a horizontal cross-sectional view taken on or about line 3—3 of Figure 2.

Figure 4 is an end elevation of the machine.

Referring now to the letters of reference placed upon the drawings:

A, denotes a rectangular frame mounted upon suitable supporting legs. B, indicates a hopper carried by the frame in which is journaled a transverse shaft C, fitted with a plurality of radiating teeth or spikes C', adapted when rotated to pulverize the soil delivered to the hopper. Mounted upon the outer end of the shaft C, is a pinion D, in mesh with a driving gear wheel E, carried by a shaft E', journaled in the frame.

$E^2$, designates a crank arm secured to the end of the shaft E, for manually rotating the latter. F, indicates a rotatable shaft slidably supported in slotted ways A', formed in the side walls of the hopper, on a plane with the shaft C. The shaft F, is provided with a plurality of teeth or spikes F', extending radially therefrom which in conjunction with the teeth of the shaft C, are adapted to disintegrate or break up the soil when the latter is rotated.

A pair of slidable rods G, formed with an eye at one end to receive the shaft F, are respectively supported in suitable guide plates H, on each side of the frame. Springs I, mounted upon the rods G, bear at one end against the guide plates H, and at the other against the end of the rods G, to force the shaft F, toward the shaft C, to the limit of its movement.

Shafts J, fitted with spikes J', are also journaled in the frame and are severally driven in the same direction through a train of alternating driving (K) and idle gear wheels K',—actuated by the manually operated driving gear wheel E;—the spikes J', of the respective shafts being adapted to pass between the spaced spikes of the adjacent shaft when rotated, that the soil may be thoroughly pulverized in its passage through the latter.

Extending from the hopper and above the rotatable shafts J, is a jointed cover plate B', which normally rests upon supporting lugs B², attached to the frame, but adapted to flex sufficiently to prevent choking the passage formed thereby along which the refuse matter passes to the point of discharge.

Having now indicated the several parts of the device by reference letters its construction and operation will be readily understood.

The soil to be pulverized having been placed in the hopper B, the crank shaft is operated to rotate the shaft C, the teeth of which in conjunction with the teeth of the shaft F, serve to initially break up the soil that it may be acted upon by the teeth of the shafts J, directly beneath.

While the shaft F, is not geared to the shaft C, it will be rotated in the opposite direction to the shaft C, by the passage of the soil as it is forced between said shafts by the rotation of the shaft C. In the event however of sticks or stones entering between the shafts, the shaft F, will be forced back along the slotted ways A', against the action of the springs I, that the sticks or stones may pass through and not clog the machine. As the soil drops to the rotatable shafts J, it will be further pulverized by the teeth J', of the latter, while foreign matter—such as the sticks or stones referred to,—will be carried along the upper surface of the soil until discharged at the end of the machine. If the machine at this point becomes clogged, due to sticks, stones, or other foreign matter, the hinged cover B², will flex sufficiently to relieve the congested condition permitting the same to pass on to the end of the machine,—while the pulverized soil will drop directly beneath the revolving shafts.

Attention is especially directed to the fact that the device is "self cleaning" as the teeth or spikes of the respective shafts when rotated pass between the spaced teeth of the adjacent shafts, thus freeing each other of any dirt that would otherwise cling to the teeth.

Having thus described my invention what I claim is:

1. In a soil pulverizing machine, a hopper, a rotatable shaft provided with a plurality of teeth adapted to pulverize material in said hopper, means for rotating said shaft, a rotatable idler shaft fitted with teeth adapted to co-operate with the teeth of the first named shaft, said idler shaft being supported in suitable slotted ways, whereby it may be adjusted laterally in relation to the first named shaft, and yieldable means for maintaining said idler shaft in its adjusted relation to said rotatable shaft.

2. In a soil pulverizing machine including a suitable frame and hopper, a rotatable shaft provided with a plurality of teeth adapted to act upon the material delivered to the hopper, means for rotating said shaft, a rotatable idler shaft fitted with a plurality of teeth and supported in slotted ways, springs adapted to yieldingly force the idler shaft toward the first named shaft, whereby it may automatically adjust itself toward or away from said first named shaft as the condition of the material passing between the teeth of said shafts may require, a plurality of rotatable shafts fitted with teeth located on a plane below the first named rotatable shafts, and means for actuating said last named shafts.

3. In a soil pulverizing machine including a suitable frame and hopper, a rotatable shaft provided with a plurality of teeth adapted to act upon the material, a pinion keyed to the shaft, a driving gear in mesh with said pinion, means for actuating the driving gear, a rotatable idler shaft fitted with a plurality of teeth and supported in slotted ways, whereby it may be adjusted toward or away from the first named rotatable shaft, springs adapted to yieldingly force the idler shaft toward the first named shaft, a plurality of rotatable shafts fitted with teeth and located on a plane below the first named rotatable shafts, a train of gears operated by the driving gear, adapted to actuate the last named rotatable shafts in one direction, and whereby the several shafts may be simultaneously actuated.

4. In a soil pulverizing machine, a hopper, a rotatable shaft provided with a plurality of teeth adapted to act upon material delivered to the hopper to pulverize the latter, means for rotating said shafts, a rotatable idler shaft supported in slotted ways and fitted with a plurality of teeth adapted to act in conjunction with the teeth of the first named shaft to pulverize the material upon the operation of the first named shaft, springs designed to act upon said idler shaft to hold the same in a yieldingly spaced relation to the first named rotatable shaft, whereby the idler shaft may automatically adjust itself toward or away from said first named rotatable shaft as the condition of the material passing between the teeth of the shafts may require, a plurality of rotatable shafts fitted with teeth located on a plane below the first named rotatable shafts, whereby the material having passed between the first named shafts may be acted upon by the rotatable shafts below, and means for actuating said last named shafts in one direction.

In testimony whereof, I sign this specification in the presence of two witnesses.

CLARENCE D. LENNON.

Witnesses:
S. E. THOMAS,
F. R. WATSON.